H. CHITTY, F. M. T. LANGE & G. W. MASCORD.
DISTRIBUTION OF ELECTROMOTIVE POWER.
APPLICATION FILED AUG. 26, 1907.
1,020,025.
Patented Mar. 12, 1912.
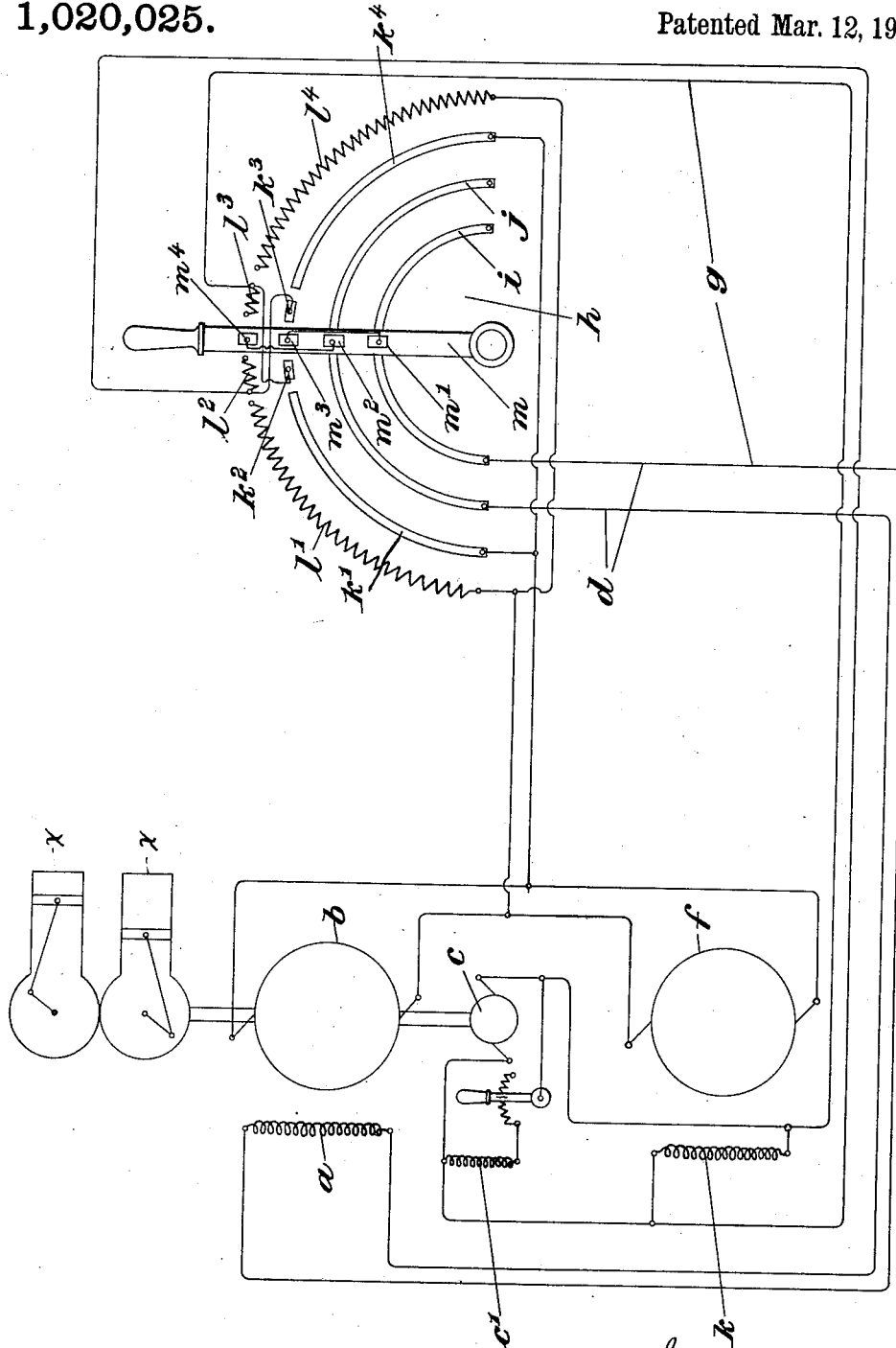

UNITED STATES PATENT OFFICE.

HENRY CHITTY, OF KENLEY, FREDERICK M. T. LANGE, OF LONDON, AND GEORGE W. MASCORD, OF BARNES, ENGLAND.

DISTRIBUTION OF ELECTROMOTIVE POWER.

1,020,025.  Specification of Letters Patent.  Patented Mar. 12, 1912.

Application filed August 26, 1907. Serial No. 390,152.

*To all whom it may concern:*

Be it known that we, HENRY CHITTY, a subject of the King of Great Britain and Ireland, residing at the Priory, Hayes Lane, Kenley, England, FREDERICK MONTAGUE TOWNSEND LANGE, a subject of the King of Great Britain and Ireland, residing at 35 Gloucester Gardens, London, W., England, and GEORGE WILLIAM MASCORD, a subject of the King of Great Britain and Ireland, residing at 5 the Crescent, Barnes, England, have invented certain new and useful Improvements in the Distribution of Electromotive Power, of which the following is a specification.

This invention relates to power transformation transmission and control and combinations of electrical apparatus of the type in which current is supplied to the working motor, or motors, by electric generators, or the like, in such a manner that speed, torque and direction of rotation can be varied independently, and the invention has for its principal object to provide means whereby the working motor or motors may be readily reversed.

According to the invention, we provide means for reversing the field of the generator, which is of the shunt wound self exciting type, by first breaking the main field circuit, then reversing the residual magnetism of the field magnets and finally again completing the main field circuit.

The invention is generally applicable to apparatus to be operated by motive power superceding the gearing usually interposed between the primary driving motor, and the machinery to be driven, and it is especially applicable to the propulsion of vehicles of all kinds.

The primary source of power may be a steam, or internal combustion engine, an electric, water or compressed air motor or any other suitable or desirable engine.

The invention is illustrated in the accompanying drawing which shows diagrammatically the connections in a system as applied in the propulsion of a motor vehicle where the primary motor $x$ driving the electric generator $b$ is for example an internal combustion type of engine.

It is to be understood that $x$ may be taken to represent any type of motor as for example electric, internal combustion, steam or the like.

$c$ is a small auxiliary generator preferably mounted upon the shaft of $b$, and $f$ is a working motor. There may however be more than one such working motor. In some cases the auxiliary generator may be belt-driven or it may be replaced by a secondary battery, or other source of electric supply.

The residual magnetism of the field magnets of the generator $b$ is reversed advantageously by means of a current temporarily switched on from the auxiliary dynamo $c$ after the main field circuit $d$ has been broken.

It will be seen that by breaking the circuit $d$ of the generator field $a$ then reversing its residual magnetism as described and finally again closing the field circuit the direction of the electromotive force of the generator $b$ will be reversed and consequently the direction of rotation of the working motor $f$ will be correspondingly reversed.

A main controller $h$ is provided for the purpose of regulating and reversing the current in the field circuit. A rheostat $c'$ is also preferably provided which rheostat serves to vary the strength of the auxiliary generator field when desired.

In its preferred form illustrated in the accompanying drawing the controller $h$ consists of two concentric contact segments $i$ $j$ electrically connected to the two terminals of the main generator field winding, a circumferential series of contact segments $k'$ $k^2$ $k^3$ $k^4$ and a circumferential series of rheostats $l'$ $l^2$ $l^3$ $l^4$ of which contacts $k'$ and $k^4$ are connected to one of the main generator terminals, rheostats $l'$ and $l^4$ being connected to the other main generator terminal. Contact $k^2$ and rheostat $l^3$ are connected to one terminal of the auxiliary generator while contact $k^3$ and rheostat $l^2$ are connected to the other auxiliary generator terminal.

The controller handle $m$ which is mounted at the center of the contact segment is provided with four contact blocks $m'$ $m^2$ $m^3$ $m^4$ respectively adapted to slide on the contact segments $i$ $j$, the contact segments $k'$ $k^2$ $k^3$ $k^4$, and the contacts of the rheostats $l'$ $l^2$ $l^3$ $l^4$. The contact block $m'$ is electrically connected to the block $m^3$ and the block $m^2$ to the block $m^4$.

The operation of the controller is as follows.—On the controller handle being rotated from its central position in a clockwise direction so that the contact blocks $m^3$ $m^4$ make contact respectively with the contact segment $k^3$ and rheostat contact $l^3$, current flows from the auxiliary generator $c$ through rheostat contact $l^3$ the contact blocks $m^4$ and $m^2$ the segment $j$ through the field winding $a$ of the main generator and back to the generator $c$ through the contact segment $i$ the blocks $m'$ $m^3$ and the contact segment $k^3$. On rotating the handle farther in the same direction the rheostat $l^3$ is first gradually cut out and then the circuit from the auxiliary generator through the main generator field may be broken or may be bridged over. On further rotation in the same direction current flows from the armature of the main generator through the rheostat contact $l^4$ the contact blocks $m^4$ $m^2$ and the contact segment $j$ to the field $a$ of the main generator and thence back to the armature through the contact segment $i$ the contact blocks $m'$ $m^3$ and the contact segment $k^4$ so that the generator works as a self-excited shunt generator. As the handle is rotated farther in the same direction the rheostat $l^4$ is gradually cut out.

The action when the handle $m$ is rotated to the left is precisely similar except that the direction of flow of current through the field winding $a$ of the main generator is reversed.

It has before been proposed to reverse the field of the main generator by means of a reversing switch interposed in the generator field circuit in a system of electromotive power of the type hereinbefore described, but in this method of reversing the field an exciting dynamo was required to be continuously employed for exciting the generator field whereas in the method employed according to the invention the exciting dynamo which only requires to be of small power, is only used temporarily for reversing the residual magnetism of the generator field, although it is preferably also used, continuously to excite the field $k$ of the working motor, or motors.

What we do claim as our invention and desire to secure by Letters Patent is:—

1. An electric power transmission apparatus, consisting in combination with a mechanical source of motive power, of a wholly self-exciting generator having but one field winding common to both internal and external sources of energy and coupled to said source of motive power, an auxiliary dynamo for supplying a momentary current to reverse the residual magnetism of the field magnets of said generator, and a working motor electrically connected to said generator, substantially as described.

2. An electric power transmission apparatus, consisting in combination with a source of motive power, of a wholly self-exciting generator having but one field winding common to both internal and external sources of energy and connected to said source of motive power, an auxiliary dynamo for supplying a momentary current to reverse the residual magnetism of the field magnets of said generator, means for varying the excitations in the field of the said generator, a working motor, and means for supplying current from the generator to the motor armature, substantially as described.

3. An electric power transmission apparatus, consisting in combination with a source of motive power, of a wholly self-exciting generator having but one field winding common to both internal and external sources of energy and connected to said source of motive power, means for reversing the residual magnetism of the field magnets of said generator, consisting of an auxiliary dynamo in the circuit of said field magnets, a rheostat for regulating the flow of current from said auxiliary dynamo, and a controller for reversing the flow of current through said circuit, a working motor, and means for supplying current from the generator to the motor armature, substantially as described.

4. The combination with a source of motive power, of a generator coupled thereto, a working motor, means for supplying current from the generator to the motor armature, means for self-exciting the field of said generator, means for varying the said excitations, and means for reversing the residual magnetism of the field magnets of said generator when the main field of the circuit is broken, consisting of an auxiliary dynamo in the circuit of said field magnets.

5. The combination with a source of motive power, of a main generator coupled thereto, means for making and breaking the field circuit of the main generator, an auxiliary generator, means for transmitting the current therefrom through the field winding of the main generator, and determining the polarity of its field in either direction when said field circuit is broken, and a rheostat for regulating the flow of current from said auxiliary generator.

6. The combination with a source of motive power, of a main generator coupled thereto, a working motor, means for supplying current from the generator to the motor armature, means for making and breaking the field circuit of the main generator, said means closing the field circuit to excite the field by current derived wholly from the armature of the generator, an auxiliary generator, means for transmitting the current therefrom through the field winding of the main generator, and determining the polarity of its field in either direction when said field circuit is broken, and means for varying the excitations in the field of said main generator.

7. In combination, a source of motive power, a wholly self-exciting generator connected to said source of motive power, means for reversing the residual magnetism of the field magnets of said generator consisting of an auxiliary dynamo adapted to be thrown into the circuit of said field magnets, and electrical connections between said auxiliary dynamo and the field windings of said generator said connections including a pair of contact segments and another pair of contact members and means for electrically connecting either one contact segment and one contact member or the other contact segment and the other contact member whereby the polarity of the field is determined.

8. In combination, a source of motive power, a wholly self-exciting generator connected to said source of motive power, means for reversing the residual magnetism of the field magnets of said generator consisting of an auxiliary dynamo adapted to be thrown into the circuit of said field magnets, electrical connections between said auxiliary dynamo and the field windings of said generator said connections including a pair of contact segments and another pair of contact members and means for electrically connecting either one contact segment and one contact member or the other contact segment and the other contact member whereby the polarity of the field is determined, a pair of contact segments connected to the respective terminals of said field magnets, a pair of contact segments connected to one of the terminals of the armature of said generator and a pair of contact members connected to the other armature terminal of said generator, said last named means also serving to electrically connect either one of said last named pair of contact segments with one of the contact segments which is connected to one terminal of the field magnets, and to electrically connect either one of said last named pair of contact members with the other of said contact segments which is connected to the other terminal of the field magnets.

9. The combination with a wholly self exciting generator of an auxiliary dynamo connected to the field magnets of said shunt dynamo, a controller consisting of two contact segments connected to the respective terminals of said field magnets, two contact segments connected to the respective terminals of the armature of said auxiliary dynamo, two contact segments in circumferential alinement with the last said two contact segments and connected to one of the terminals of the armature of said shunt dynamo, two contact members connected to the other armature terminal of the shunt dynamo, a handle, and four contact blocks attached to said handle and respectively adapted to contact with said contact segments and contact members said contact blocks being electrically connected in the manner and substantially as described.

10. The combination with a wholly self exciting generator of an auxiliary dynamo connected to the field magnets of said shunt dynamo, a controller consisting of two contact segments connected to the respective terminals of said field magnets, two contact segments connected to the respective terminals of the armature of said auxiliary dynamo, two contact segments in circumferential alinement with the last said two contact segments and connected to one of the terminals of the armature of said shunt dynamo, two contact members connected to the other armature terminal of the shunt dynamo, four rheostats adapted to be inserted in the circuit from the auxiliary dynamo through the shunt dynamo field and from the armature of the shunt dynamo through the shunt dynamo field substantially as described, a handle, and four contact blocks attached to said handle and respectively adapted to contact with said contact segments and contact members, said contact blocks being electrically connected in the manner and substantially as described.

11. The combination with a wholly self-exciting generator, of mechanism for reversing the electromotive force thereof, said mechanism comprising a separate source of electrical energy, means for making and breaking the field circuit of the generator, means for causing the current derived from said separate source, to reverse the residual magnetism of the field magnet of the generator when the field circuit thereof is broken, and thereafter completing said circuit and permitting the field magnet to become energized wholly by self-excitation.

12. The combination with a generator, of mechanism for reversing the electromotive force thereof, said mechanism comprising means for variably exciting the field magnet of the generator from its armature, means for making and breaking the field circuit of said generator, and means for reversing the residual magnetism of the field magnet of said generator when the said circuit is broken.

13. The combination with an electric generator, of mechanism for controlling the same, said mechanism comprising means for making and breaking the field circuit, a separate source of electrical energy, and means for transmitting the current from said source through the field winding of the generator, and determining the polarity of its field in either direction when said field circuit is broken, said making and breaking means closing the field circuit to excite the field by current derived wholly from the armature of the generator.

14. The combination with an electric motor, of a generator, means for supplying current from the generator to the motor armature, and means for self-exciting the field of said generator varying the said excitations, and reversing the residual magnetism of the field of said generator when the main field of the circuit is broken.

In testimony whereof we have hereunto signed our names to this specification in the presence of two subscribing witnesses.

HENRY CHITTY.
F. M. T. LANGE.
GEO. W. MASCORD.

Witnesses:
H. D. JAMESON,
F. L. RAND.

Copies of this patent may be obtained for five cents each, by addressing the "Commissioner of Patents, Washington, D. C."